Oct. 20, 1942.　　　R. G. SIMMS ET AL　　　2,299,507
CELL COVER FOR STORAGE BATTERIES
Filed July 5, 1941

Inventors
Ralph G. Simms
Paul J. Harriman
By Willis F. Avery
Atty

Patented Oct. 20, 1942

2,299,507

UNITED STATES PATENT OFFICE 2,299,507

CELL COVER FOR STORAGE BATTERIES

Ralph G. Simms, Medford, and Paul J. Harriman, Newton, Mass., assignors to The B. F. Goodrich Company, New York, N. Y., a corporation of New York Application July 5, 1941, Serial No. 401,064

1 Claim. (Cl. 136—178)

This invention relates to cell covers for storage batteries, and is especially useful where control of venting of the cells is desired.

In the use of storage batteries water is lost by evaporation and must frequently be added to the electrolyte. Gas is evolved during charging of the cells and it is necessary to provide means for venting such gas. In order to provide for filling the cells without over-filling them, it has been proposed to form the cell cover with a depending skirt around the vent well through which the cell is filled. Over-filling with such a cell cover results in gas being trapped above the electrolyte and below the cover about the vent well skirt, and escape of the gas below the skirt to the vent well when the cell is tipped, causes splashing and spray of electrolyte from the vent well unless precautions are taken to provide for venting of the accumulated gas. It is desirable, therefore, to provide means whereby the space surrounding the vent well below the cover may be vented from above the surface of the electrolyte when the vent plug is in place.

The present invention aims to provide an improved cell cover structure and to overcome the aforementioned difficulties.

The principal objects of the invention are to provide improved means for preventing over-filling of the cell, to provide improved automatic venting of the cell when the vent plug is in place, to provide simplicity of construction, and to accomplish these results with a minimum of parts.

A further object is to provide convenience of assembly together with assurance that the parts will remain in the desired relation.

These and other objects will appear from the following description and the accompanying drawing.

Figure 1:
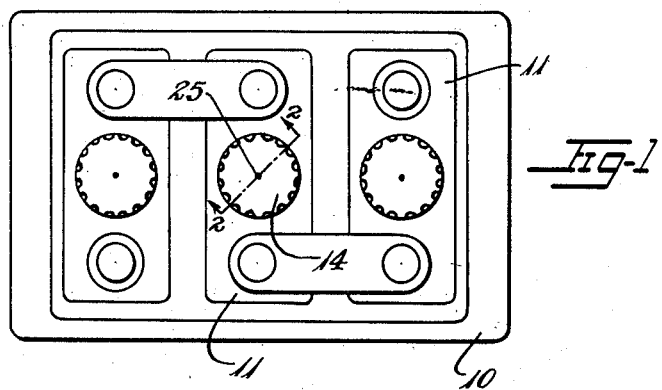
Fig. 1 is a plan view of a three-cell storage battery embodying the invention.

In the illustrative embodiment of the invention is incorporated a cell cover which is formed with a vent well having a depending valve chamber enclosing a collapsible tubular valve member of resilient material. The chamber is vented to the gas space above the electrolyte and the valve seats against opposed annular seats to close such vent when the plug is removed. The vent plug has means for depressing the valve from its upper seat when the vent plug is in place to provide for venting the cell.

In accordance with the invention the upper annular valve seat or rim is made integral with the cell cover and extends inwardly from the valve chamber while the tubular valve member is formed with an outwardly directed flange adapted to overlap and seal against the rim but capable of being distorted so as to permit forcing it past the rim during assembly of the structure.

Referring to the drawing, the storage battery 10 has a plurality of cell covers 11 each having a filling opening 12, threaded internally as at 13, to receive a vent plug 14. The vent well depends below the cover as a skirt 15 terminating in an inwardly-turned flange 16. A second flange or rim 17 projects inwardly from the skirt above the flange 16 providing a seat for retaining a valve in accordance with the invention. The wall of the skirt is vented as by slots 18, 18' so as to connect the space above the electrolyte about the well with the interior of the well between the flanges 16 and 17.

The assembly includes a collapsible closure member or valve to seal the space above the electrolyte and below the cover from the filling opening when the filler plug is not in place. A tubular valve member 19 of resilient rubber-like material such as soft vulcanized rubber composition is provided. This valve member has outwardly-turned end flanges 20 and 21 adapted to seat against the flanges 16 and 17 respectively, the main body portion of the valve member being preferably less in diameter than the inner diameter of the retainer rim 17, for a purpose explained more fully hereinafter. The walls of the valve member between the flanges are formed in annular folds 22 to facilitate an accordian-like movement of the end flanges 20, 21 toward each other.

To provide for compression of the valve member, the filler plug 14 has an annular depending skirt 23 adapted to contact the flange 21 and depress it when the plug is screwed in place. The skirt is formed with one or more apertures, such as the notch 24 for permitting gas to pass from its exterior to its interior where it eventually may escape to the atmosphere through a vent 25 through the top of the plug.

Figure 2:
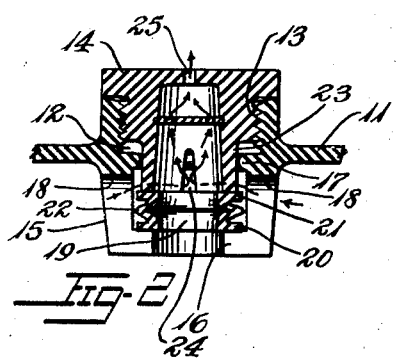
Fig. 2 is a cross-sectional view of the cell cover structure, taken on line 2—2 of Fig. 1, with the vent plug in place, the parts being in venting position, parts of the cell cover being broken away.

Due to the circumferential continuity of the overlapping flanges 17 and 21 and the fact that the valve member is normally longer than the space between the flanges 16 and 17, the flange 21 seals against the flange 17 when the plug is not in place and prevents escape of gases by way of the apertures 18, 18' from below the cover and above the electrolyte about the skirt 15 when the electrolyte reaches the level of the flange 20, preventing further filling of the cell. When the plug 14 is screwed in place, its skirt 23 depresses the flange 21 from contact with the flange 17 and permits gas to travel as indicated by the arrows in Fig. 2 from the space below the cell cover through apertures 18, 18', and aperture 24 to the interior of the plug where it escapes through vent 25 to the atmosphere.

Figure 3:
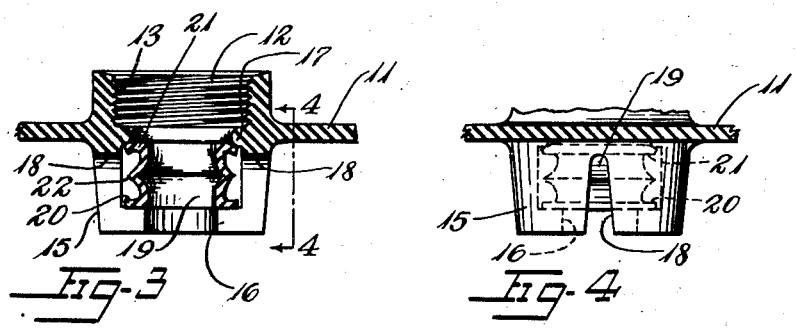
Fig. 3 is a similar view of the cell cover structure with the vent plug removed for filling.
Figure 4:
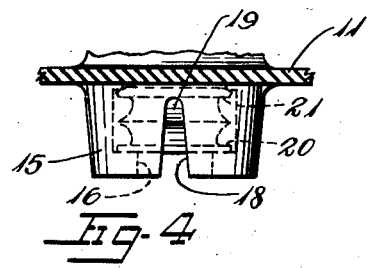
Fig. 4 is a sectional view taken on line 4—4 of Fig. 3.

The flange 21 of the valve while of greater diameter than the opening surrounded by the flange 17, is of flexible resilient material so that it may be distorted and forced past the flange or rim 17 from above. Upon recovering its shape, due to its resilience, the flange 21 will be seated against the rim resiliently and will be depressed somewhat about its periphery by contact with the rim as shown in Fig. 3, providing a circumferentially continuous seal over a substantial area of contact.

This construction permits the manufacture of the flange 17 integral with the cover 11, thereby providing a structure with a minimum number of parts, and the flanges prevent loss of the valve member when the plug is removed. Also, the likelihood of improper assembly or damage to the parts is minimized.

In filling the cell, the plug is removed, releasing pressure on the valve member. The valve member seats against the flange or rim 17, sealing the gas space above the electrolyte. When the plug is replaced the skirt of the plug depresses the valve member opening the space above the electrolyte to the atmosphere. When the upper flange of the valve member is sealed against the flange or rim 17 the cell may be filled until the electrolyte reaches the bottom flange of the valve member. Therefore no substantial amount of fluid can be added as the trapped gas around the vent well prevents rising of the electrolyte level and the vent well which has only a small capacity will overflow with only slight addition of fluid.

Variations may be made without departing from the scope of the invention as it is defined by the following claim.

We claim:

A cell cover structure for storage batteries, said structure comprising a cover having a filling opening adapted to receive and retain a vent plug, said cover having an annular skirt depending therefrom about the opening to the desired level of the electrolyte, said skirt being formed with an inwardly projecting rim integral with the cover and defining an opening smaller than the skirt, a flange support for a valve located on said skirt below said rim and providing an opening smaller than the skirt, said skirt having a side opening providing communication between the gas space outside the skirt and the space within the skirt between said rim and said support, a collapsible tubular valve member of resilient rubber-like material normally resting on said support and seated against said rim to prevent communication from said side opening to the atmosphere when the plug is removed from the filling opening, said valve comprising a bellows-like circumferentially corrugated body, and an outwardly directed flange having a diameter larger than the opening defined by said rim and adapted to be forced through said opening under distortion and to recover its shape therebelow to provide a seal against said rim, and a vented plug adapted to be secured in said filling opening and having means extending through the opening defined by said rim when the plug is in place and depressing said valve by engagement with its flange to establish communication between said gas space and the atmosphere through said plug.

RALPH G. SIMMS.
PAUL J. HARRIMAN.